(12) United States Patent
Lee

(10) Patent No.: US 10,605,405 B2
(45) Date of Patent: Mar. 31, 2020

(54) ELECTRIC GREASE BARREL PUMP

(71) Applicant: AHWON CORPORATION, Gyeonggi-do (KR)

(72) Inventor: Juho Lee, Gyeonggi-do (KR)

(73) Assignee: AHWON CORPORATION, Gunpo-si (KR)

( * ) Notice: Subject to any disclaimer, the term of this patent is extended or adjusted under 35 U.S.C. 154(b) by 207 days.

(21) Appl. No.: 15/561,964

(22) PCT Filed: Apr. 3, 2015

(86) PCT No.: PCT/KR2015/003372
§ 371 (c)(1),
(2) Date: Sep. 26, 2017

(87) PCT Pub. No.: WO2016/159421
PCT Pub. Date: Oct. 6, 2016

(65) Prior Publication Data
US 2018/0112822 A1  Apr. 26, 2018

(30) Foreign Application Priority Data
Mar. 27, 2015 (KR) .................. 10-2015-0043133

(51) Int. Cl.
F16N 35/00 (2006.01)
F16N 13/02 (2006.01)
F16N 13/06 (2006.01)
F16N 19/00 (2006.01)

(52) U.S. Cl.
CPC ............ *F16N 35/00* (2013.01); *F16N 13/02* (2013.01); *F16N 13/06* (2013.01); *F16N 19/00* (2013.01); *F16N 2013/063* (2013.01)

(58) Field of Classification Search
CPC .......... F16N 35/00; F16N 19/00; F16N 13/06; F16N 13/02; F16N 2013/063
See application file for complete search history.

(56) References Cited

U.S. PATENT DOCUMENTS

| | | | | |
|---|---|---|---|---|
| 4,738,600 A | * | 4/1988 | Safford .................. | F04B 9/105 184/29 |
| 4,819,764 A | * | 4/1989 | Huang ..................... | F16N 5/00 184/36 |
| 9,388,940 B2 | * | 7/2016 | Conley .................... | F16N 7/14 |

(Continued)

FOREIGN PATENT DOCUMENTS

| JP | 2005-036890 A | 2/2005 |
|---|---|---|
| KR | 10-0265252 B1 | 9/2000 |
| KR | 10-0888024 B1 | 3/2009 |

(Continued)

OTHER PUBLICATIONS

Machine translation of KR-20130129581-A (Year: 2013).*

*Primary Examiner* — Michael C McCullough
(74) *Attorney, Agent, or Firm* — Heedong Chae; Lucem, PC

(57) ABSTRACT

The present invention relates to an electric grease barrel pump and, more particularly, to an electric grease barrel pump which is configured to supply an appropriate amount of grease to an attachment connected to a distribution valve by enabling an actuator of the distribution valve to operate in conjunction with and according to a change in the number of stages of a driving means.

13 Claims, 4 Drawing Sheets

(56) References Cited

U.S. PATENT DOCUMENTS 9,458,966 B2 * 10/2016 Holman .................. F04B 17/03
2012/0181114 A1 * 7/2012 Paluncic ................. F16N 25/00
184/6.28

FOREIGN PATENT DOCUMENTS

| KR | 10-1027653 B1 | 4/2011 | |
|----|----|----|----|
| KR | 20130129581 A * | 11/2013 | ............ E02F 9/2228 |
| KR | 10-1364760 B1 | 2/2014 | |

* cited by examiner

-- Prior Art --

ELECTRIC GREASE BARREL PUMP

CROSS-REFERENCE TO RELATED APPLICATION

This application claims the benefit of Korean application No. 10-2015-0043133, filed on Mar. 27, 2015 with the Korean Intellectual Property Office, the disclosure of which is incorporated herein by reference.

TECHNICAL FIELD

The present invention relates to an electric grease barrel pump and more particularly, to an electric grease barrel pump for supplying an appropriate amount of grease to an attachment coupled to a distribution valve by enabling an actuator of the distribution valve to operate in conjunction with a change in driving steps of a driving device.

BACKGROUND ART

In general, grease is a kind of lubricant that is supplied to form an oil film between components of a rotation part, such as a roller or a bearing, subjected to a large load. Such grease is supplied in a semi-solid state, turns into a liquid state by pressure and heat when a machine is operated, and changes into the semi-solid state again when the machine is stopped.

Therefore, if the grease is not supplied between the rotation components, burn out or seizures occur due to friction, so that a worker has to frequently check the amount of grease and replenish the grease sufficiently as necessary.

Such grease has a high viscosity, and a grease gun is used to inject a small amount of grease. However, when it is necessary to inject a large amount of grease having a high viscosity, a separate automatic grease injection pump to supply the grease to the machine.

Such an automatic grease injection pump has been developed, and an example thereof is disclosed in Korean Patent Application Publication No. 2013-129581 (hereinafter referred to as "Related art document 1").

FIG. 1 is a mew showing a conventional automatic grease injection apparatus disclosed in Related art document 1.

As shown in FIG. 1, the conventional automatic grease injection apparatus includes: a pumping device 110 for supplying grease accommodated in a tank 112; a driving device for driving the pumping device 110; a supply pipe 120 for supplying the grease discharged from the pumping device 110; a grease distribution unit 121 provided at an end on a downstream side of the supply pipe 120; a check valve 128 installed in the supply pipe 120 to prevent the grease from flowing backward; a circulation pipe 130 in communication with the supply pipe 120 for circulating the grease to the pumping device 110; a relief valve 132 installed in the circulation pipe 130 so as to be opened and closed according to pressure in the circulation pipe 130; and a control unit 140 for controlling the driving device in each mode. In this case, the grease distribution unit 121 includes: a main function supply pipe 121a for supplying the grease to equipment; an auxiliary function supply pipe 121b for supplying the greases to a composite attachment; and a three-way pipe 126 for selectively supplying the grease to the main function supply pipe 121a and the auxiliary function supply pipe 121b. In addition, a cylinder 116 is installed at the center of the pumping device 110 in order to supply the grease from a bottom of the pumping device 110.

However, the conventional automatic grease injection apparatus disclosed in Related art document 1 injects a fixed amount of grease, so that it is suitable for dedicated equipment prepared in the stage of manufacturing, whereas when the grease is supplied to other equipment, excessively supplied grease may contaminate the equipment, and insufficiently supplied grease may cause the burn out of the equipment.

In addition, since a discharge amount of the grease cannot be controlled, the precision of the discharge amount of the grease is decreased when the automatic grease injection apparatus is used for a long period of time.

Further, when air is introduced into the grease, an air pocket is formed, so that the grease sucked through the cylinder may not be supplied in an appropriate amount.

In addition, if foreign substances are contained in the grease circulated through the circulation pipe, the contaminated grease is supplied through the cylinder.

DOCUMENT OF RELATED ART

Patent Document (Patent document 1) Korean Patent Application Publication No. 2013-129581 (published on Nov. 29, 2013)

DISCLOSURE

Technical Problem

To solve the problems described above, an object of the present invention is to provide an automatic grease injection apparatus for supplying an appropriate amount of grease to an attachment coupled to a distribution valve by enabling an actuator of the distribution valve to operate in conjunction with a change in driving steps of a driving device.

In addition, an object of the present invention is to provide an automatic grease injection apparatus capable of supplying grease from which foreign substances are removed.

Technical Solution

The present invention provides an electric grease barrel pump including: a pumping device for supplying grease; a driving device for driving the pumping device in multiple driving steps; a supply pipe to which the grease is discharged from the pumping device; a check valve installed in the supply pipe to prevent the grease from flowing backward to the pumping device; a distribution valve installed downstream of the supply pipe to selectively supply the grease to each attachment coupled to equipment; an actuator for controlling operation of the distribution valve; a circulation pipe installed between the supply pipe and the pumping device to circulate the grease to the pumping device; a relief valve installed in the circulation pipe; a transmission unit for controlling the driving device; and a connection unit that enables the actuator to operate in conjunction with a change in the driving steps of the driving device.

In this case, it is preferred that the transmission unit includes a planetary gear.

In addition, it is preferred that the pumping device includes: a tank for accommodating the grease; a push plate that slides along an inside of the tank; a cylinder extending through a center of the push plate and having a flow path for the grease; and a piston shaft disposed inside the cylinder to supply the grease by moving up and down through an operation of a driving motor.

In addition, in the electric grease barrel pump according to the present invention, it is preferred that an agitation device is provided at a lower portion of the piston shaft.

In this case, it is preferred that the agitation device includes a perforated plate extending radially at the lower portion of the piston shaft.

In addition, it is preferred that the agitation device includes a blade that rotates as the piston shaft moves up and down.

In this case, it is preferred that the piston shaft and the blade are coupled to each other by a worm gear.

In addition, in the electric grease barrel pump according to the present invention, it is preferred to provide a laser sensor for detecting a level of the grease accommodated in the tank.

In this case, it is preferred that an alarm is generated when the level detected by the laser sensor is lower than a predetermined level.

Advantageous Effects

In the electric grease barrel pump according to the present invention, the actuator of the distribution valve is operated in conjunction with a change in driving steps of the driving device that is driven in multiple driving steps, so that an appropriate amount of grease can be supplied to each attachment Therefore, the equipment can be prevented from being contaminated due to excessive supply of grease, or the equipment can be prevented from being burned out due to insufficient supply of grease.

In addition, in the electric grease barrel pump according to the present invention, the agitation device is provided at the lower portion of the piston shaft to agitate the grease, so that the air pocket of grease can be removed so as to supply an appropriate amount of grease.

In addition, in the electric grease barrel pump according to the present invention, the amount of grease accommodated in the tank is detected in a noncontact manner by using the laser sensor, so that the reliability is improved and the driving device can be prevented from being burned out in advance.

In addition, in the electric grease barrel pump according to the present invention, an alarm is generated when the level detected by the laser sensor is lower than a predetermined level, so that the grease can he continuously supplied by replenishing the grease or replacing cartridges.

BEST MODE

Hereinafter, an electric grease barrel pump according to one embodiment of the present invention will be described with reference to the accompanying drawings.

Figure 1:
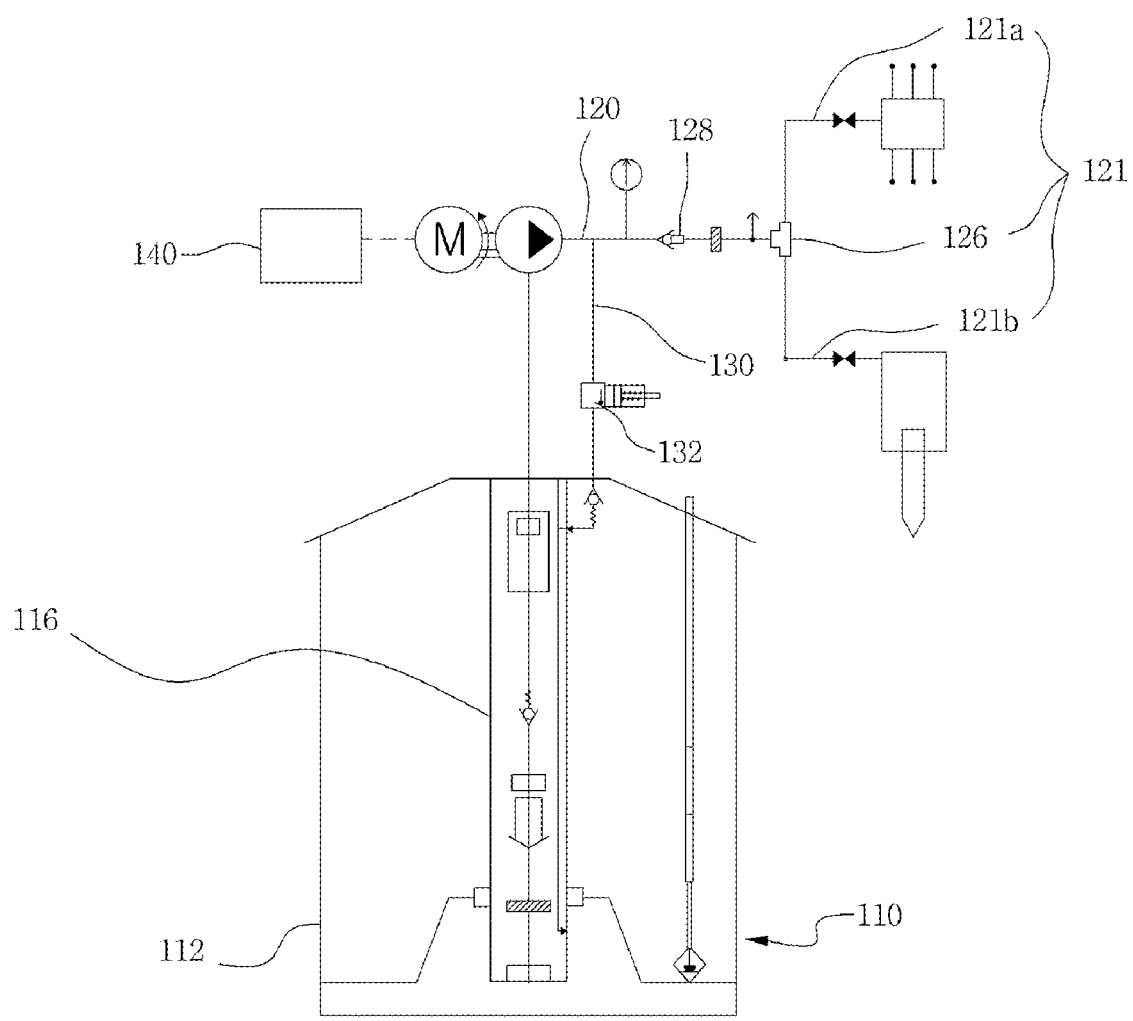
FIG. 1 is a view showing a conventional automatic, grease injection apparatus disclosed in Related art document 1
Figure 2:
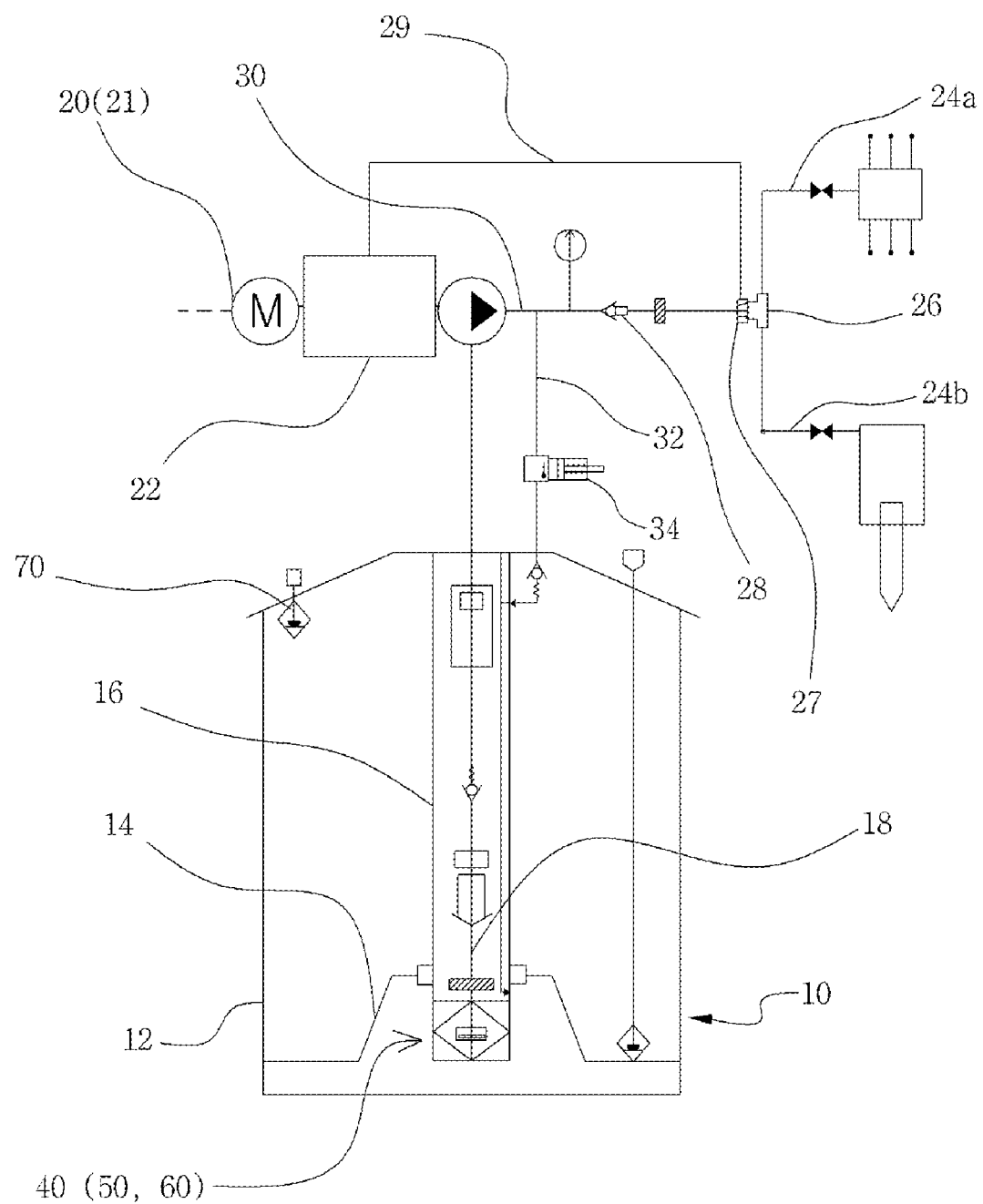
FIG. 2 is a view showing an electric grease barrel pump according to one embodiment of the present invention.
Figure 3:
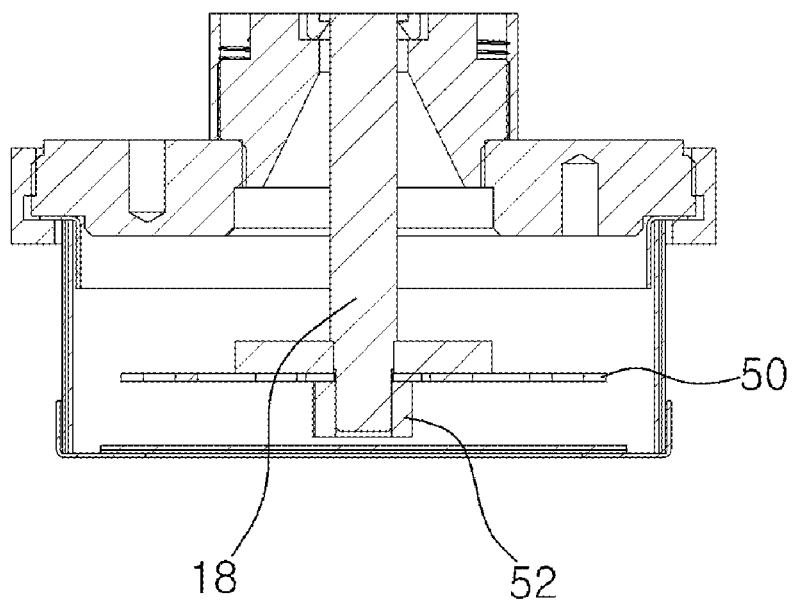
FIG. 3 is a view showing an agitation device of the electric grease barrel pump according to one embodiment of the present invention.
Figure 4:
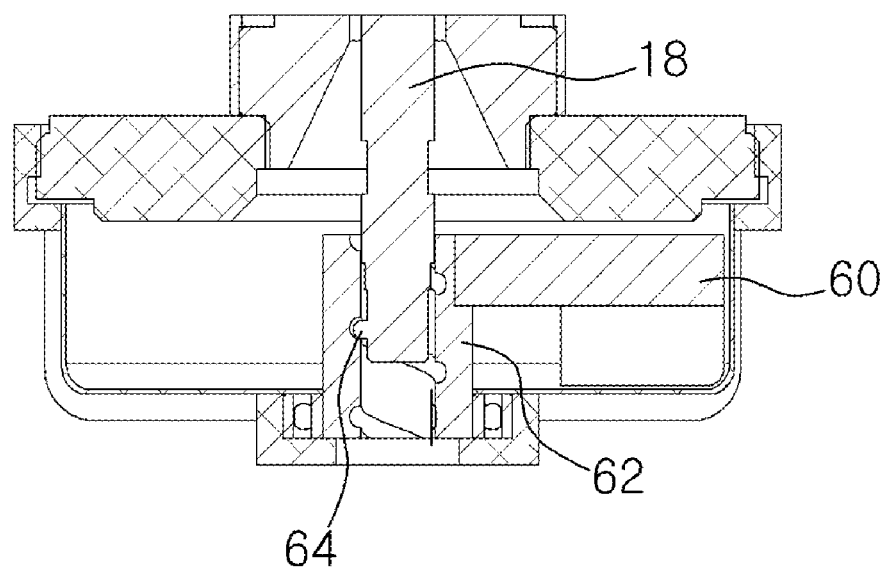
FIG. 4 is a view showing an agitation device of the electric grease barrel pump according to another embodiment of the present invention.

FIG. 2 is a view showing an electric grease barrel pump according to one embodiment of the present invention, FIG. 3 is a view showing an agitation device of the electric grease barrel pump according to one embodiment of the present invention, and FIG. 4 is a view showing an agitation device of the electric grease barrel pump according to another embodiment of the present invention.

As shown in FIGS. 2 to 4, according to one embodiment of the present invention, an electric grease barrel pump includes: a pumping device 10; a driving device 20 for driving the pumping device 10 in multiple driving steps; a supply pipe 30 to which the grease is discharged from the pumping device 10; a check valve 28 installed in the supply pipe 30 to prevent the grease from flowing backward to the pumping device 10; a distribution valve 26 installed downstream of the supply pipe 30 to selectively supply the grease to each attachment 24a and 24b; an actuator 27 for controlling operation of the distribution valve 26; a circulation pipe 32 installed between the supply pipe 30 and the pumping device 10 to circulate the grease to the pumping device 10; a relief valve 34 installed in the circulation pipe 32; a transmission unit 22 for controlling the driving device 20; and a connection unit 29 that enables the actuator 27 to operate in conjunction with a change in the driving; steps of the driving device 20.

First, it is preferred that the pumping device 10 includes: a tank 12 for accommodating the grease; a push plate 14 that slides along an inside of the tank 12; a cylinder 16 extending through a center of the push plate 14 and having a flow path for the grease; and a piston shaft 18 disposed inside the cylinder 16 to supply the grease by moving up and down through an operation of a driving motor.

In this case, since a technique of supplying the grease through the cylinder 16 as the piston shaft 18 moves up and down is known to those skilled in the art, the detailed description thereof will be omitted.

It is preferred that the tank 12 accommodates the grease and has a cylindrical shape to allow the push plate 14 to easily slide.

Preferably, the push plate 14 slides up and down in the tank 12 and is gradually Inclined downward in the radial direction so that the grease in a peripheral portion of the tank 12 is gathered at the center of the tank 12 and discharged to the outside. The edge of the push plate 14 makes close contact with an inner peripheral surface of the tank 12 to prevent contaminants from penetrating under the push plate 14.

The driving device 20 drives the pumping device 10, and enables the piston 18 of the pumping device 10 to move up and down so that the grease is discharged through the flow path of the piston 18. In this embodiment, the driving device is a hydraulic motor 21 which is reliably operated. However, various driving devices such as an electric motor can be used as necessary. The drive device 20 has a transmission unit 22 operated to supply various amounts of grease. In this case, it is preferred that the transmission unit 22 is a planetary gear.

The supply pipe 30 communicates with the pumping device 10. Therefore, the grease supplied from the pumping device 10 through the supply pipe 30 is supplied to portions where the grease is required.

The check valve 28 is installed in the supply pipe 30 to prevent the grease from flowing backward to the pumping device 10. In this case, the check valve 28 may constitute a backflow prevention circuit to prevent a loss of a sectional area.

The circulation pipe 32 communicates with the supply pipe 30, and circulates the grease to the pumping device 10 when the pressure of the grease supplied to each portion is equal to or higher than a preset pressure.

In addition, the circulation pipe 32 is provided with a relief valve 34 so as to operate based on the preset pressure. In this case, it is preferred that a lower end of the circulation pipe 32 communicates with the lower portion of the push plate 14 of the tank 12. Since the circulation pipe 32 communicates with the lower portion of the push plate 14, the grease can be circulated into the tank 12 without being contaminated. In addition, it is preferred that the circulation pipe 32 communicates with the lower portion of the push plate 14 through the inner peripheral surface of the cylinder 16. Therefore, the installation space required to circulate the grease can be minimized.

In addition, the distribution valve 26 installed downstream of the supply pipe 30 to selectively supply the grease to each attachment 24a and 24b, and the actuator 27 for controlling operation of the distribution valve 26 are provided. In this case, the connection unit 29 is provided between the actuator 27 and the transmission unit 22 to control the actuator 27 in conjunction with the: operation of the transmission unit 22. In other words, since the actuator 27 operates after a flow path of a hydraulic circuit is changed through the operation of the transmission unit 22, the flow path through which the grease is supplied is changed. In this case, the attachments 24a and 24b are equipment 24a and a grease gun 24b, respectively. Although one piece of equipment 24a and one grease gun 24b are included in this embodiment, a larger number of attachments can be installed as necessary.

Further, according to one embodiment of the present invention, the electric grease barrel pump further includes an agitation device 40 provided at the lower portion of the piston shaft 18 to agitate the grease.

The agitation device 40 is provided at the lower portion of the piston shaft 18 to agitate the grease, so that air pockets are prevented. Therefore, the air pockets are removed, so that an appropriate amount of grease can be supplied through the supply pipe 30.

In this case, as shown in FIG. 3, it is preferred that the agitation is a perforated plate 50 extending radially at the lower portion of the piston shaft 18. The perforated plate 50 is fixed to the lower portion of the piston shaft 18 by a nut 52. As the piston shaft 18 piston shaft 18 moves up and down, the grease passed through the perforated plate 50 is collapsed after forming a columnar shape temporarily, thereby removing the air pockets.

As shown in FIG. 4, another example of the agitation device 40 may be a blade 60 that rotates as the piston shaft moves up and down. In this case, it is preferred that the blade 60 is coupled to the piston shaft 18 by a worm gear. The blade 60 is fixed to an outside of a rotation cylinder 62 having a female screw, and the piston shaft 18 is provided at the lower portion thereof with a protruding pin 64 inserted into the female screw of the rotation cylinder 62. Therefore, the rotation cylinder 62 rotates as the piston shaft 18 moves up and down, and the blade 60 fixed to the rotation cylinder 62 rotates as the rotation cylinder 62 rotates. The grease is agitated as the blade 60 rotates as described above.

In addition, according to one embodiment of the present invention, it is preferred that the electric grease barrel pump is provided with a laser sensor 70 for detecting a level of the grease accommodated in the tank 12. In this case, the laser sensor 70 Is installed on the ceiling of the tank and irradiates with a laser to measure an amount of the remaining grease.

Therefore, the burn out of the driving device 20 due to the operation of the driving device 20 where the grease is exhausted can be prevented in advance.

In addition, it is preferred that an alarm is generated when the level detected by the laser sensor 70 is lower than a predetermined level.

Further, it is preferred that a lamp emits light simultaneously with the alarm when the level detected by the laser sensor 70 is lower than a predetermined level.

In addition, it is also possible to transmit an alarm signal to a mobile terminal of a manager through mobile communication when the level detected by the laser sensor 70 is lower than a predetermined level.

DESCRIPTION OF REFERENCE NUMERALS

| 10: | Pumping device | 20: | Driving device |
| 22: | Transmission unit | 30: | Supply Pipe |
| 40: | Agitation device | 50: | Perforated plate |
| 60: | Blade | 70: | Laser sensor |

The invention claimed is:

1. An electric grease barrel pump comprising:
    a pumping device for supplying grease;
    a driving device for driving the pumping device in multiple driving steps;
    a supply pipe to which the grease is discharged from the pumping device;
    a check valve installed in the supply pipe to prevent the grease from flowing backward to the pumping device;
    a distribution valve installed downstream of the supply pipe to selectively supply the grease to each attachment;
    an actuator for controlling operation of the distribution valve;
    a circulation pipe installed between the supply pipe and the pumping device to circulate the grease to the pumping device;
    a relief valve installed in the circulation pipe;
    a transmission unit; and
    a connection unit that enables the actuator to operate in conjunction with a change in the driving steps of the driving device,
    wherein the connection unit is provided between the actuator and the transmission unit to control the actuator in conjunction with the operation of the transmission unit.

2. The electric grease barrel pump of claim 1, wherein the transmission unit includes a planetary gear to supply various amounts of grease to the driving device.

3. The electric grease barrel pump of claim 1, wherein the pumping device includes:
    a tank for accommodating the grease;
    a push plate that slides along an inside of the tank;
    a cylinder extending through a center of the push plate and having a flow path for the grease; and
    a piston shaft disposed inside the cylinder to supply the grease by moving up and down through an operation of a driving motor.

4. The electric grease barrel pump of claim 3, wherein an agitation device is provided at a lower portion of the piston shaft.

5. The electric grease barrel pump of claim 4, wherein the agitation device includes a perforated plate extending radially at the lower portion of the piston shaft.

6. The electric grease barrel pump of claim 4, wherein the agitation device includes a blade that rotates as the piston shaft moves up and down.

7. The electric grease barrel pump of claim 6, wherein the piston shaft and the blade are coupled to each other by a worm gear.

8. The electric grease barrel pump of claim 3, further comprising a laser sensor for detecting a level of the grease accommodated in the tank.

9. The electric grease barrel pump of claim 8, further comprising an alarm wherein the alarm is generated when the level detected by the laser sensor is lower than a predetermined level.

10. The electric grease barrel pump of claim 1, further comprising a laser sensor for detecting a level of the grease accommodated in the tank.

11. The electric grease barrel pump of claim 10, wherein the laser sensor generates an alarm when the level detected by the laser sensor is lower than a predetermined level.

12. An electric grease barrel pump comprising:
a pumping device for supplying grease;
a driving device for driving the pumping device in multiple driving steps;
a supply pipe to which the grease is discharged from the pumping device;
a check valve installed in the supply pipe to prevent the grease from flowing backward to the pumping device;
a distribution valve installed downstream of the supply pipe to selectively supply the grease to each attachment;
an actuator for controlling operation of the distribution valve;
a circulation pipe installed between the supply pipe and the pumping device to circulate the grease to the pumping device;
a relief valve installed in the circulation pipe;
a transmission unit; and
a connection unit that enables the actuator to operate in conjunction with a change in the driving steps of the driving device,
wherein the pumping device includes:
a tank for accommodating the grease;
a push plate that slides along an inside of the tank;
a cylinder extending through a center of the push plate and having a flow path for the grease; and
a piston shaft disposed inside the cylinder to supply the grease by moving up and down through an operation of a driving motor,
wherein an agitation device is provided at a lower portion of the piston shaft,
wherein the agitation device includes a blade that rotates as the piston shaft moves up and down, and
wherein the piston shaft and the blade are coupled to each other by a worm gear.

13. The electric grease barrel pump of claim 12, wherein the transmission unit includes a planetary gear.

* * * * *